(12) United States Patent
Nakayama et al.

(10) Patent No.: US 11,279,872 B2
(45) Date of Patent: Mar. 22, 2022

(54) PROCESS FOR PRODUCING DYE-CONTAINING THERMOSETTING RESIN PARTICLES

(71) Applicant: KONICA MINOLTA, INC., Chiyoda (JP)

(72) Inventors: Shin Nakayama, Hino (JP); Kensaku Takanashi, Hino (JP)

(73) Assignee: Konica Minolta, Inc., Tokyo (JP)

( * ) Notice: Subject to any disclaimer, the term of this patent is extended or adjusted under 35 U.S.C. 154(b) by 64 days.

(21) Appl. No.: 16/064,059

(22) PCT Filed: Dec. 21, 2015

(86) PCT No.: PCT/JP2015/085660
§ 371 (c)(1),
(2) Date: Jun. 20, 2018

(87) PCT Pub. No.: WO2017/109828
PCT Pub. Date: Jun. 29, 2017

(65) Prior Publication Data
US 2019/0010388 A1    Jan. 10, 2019

(51) Int. Cl.
| | |
|---|---|
| *C09K 11/02* | (2006.01) |
| *C08K 5/29* | (2006.01) |
| *C08J 3/07* | (2006.01) |
| *C09B 67/08* | (2006.01) |
| *G01N 21/64* | (2006.01) |
| *C08L 101/00* | (2006.01) |
| *C09B 67/46* | (2006.01) |
| *C09K 11/06* | (2006.01) |

(52) U.S. Cl.
CPC .............. *C09K 11/025* (2013.01); *C08J 3/07* (2013.01); *C08K 5/29* (2013.01); *C08L 101/00* (2013.01); *C09B 67/0005* (2013.01); *C09B 67/009* (2013.01); *C09B 67/0013* (2013.01); *C09K 11/06* (2013.01); *G01N 21/64* (2013.01); *G01N 21/6428* (2013.01); *C08J 2379/02* (2013.01); *C09K 2211/1007* (2013.01); *C09K 2211/1018* (2013.01); *G01N 2021/6439* (2013.01)

(58) Field of Classification Search
CPC ............ C09K 11/025; C09K 11/06; C09K 2211/1018; C09K 2211/1007; C08K 5/29; C08J 3/07; C08J 2379/02; C09B 67/0005; C09B 67/0013; G01N 21/6428; G01N 2021/6439
See application file for complete search history.

(56) References Cited

U.S. PATENT DOCUMENTS

2014/0220598 A1* 8/2014 Takanashi .......... G01N 21/6428
                                                      435/7.23
2016/0018300 A1    1/2016 Takanashi et al.

FOREIGN PATENT DOCUMENTS

| JP | 8-48492 | 2/1996 | |
|---|---|---|---|
| JP | 2004-189900 | 7/2004 | |
| JP | 2009-52029 | 3/2009 | |
| JP | 2010-43187 | 2/2010 | |
| JP | 2010-248475 | 11/2010 | |
| JP | 2010248475 A * | 11/2010 | ............. C08G 12/30 |
| JP | 2012-145782 | 8/2012 | |
| JP | 2015-108572 | 6/2015 | |
| WO | WO 2007/149828 | 12/2007 | |
| WO | WO 2014/136776 | 9/2014 | |
| WO | WO 2014/136885 | 9/2014 | |

OTHER PUBLICATIONS

Qi Zhang, Yan Han, Wei-Cai Wang, Lei Zhang, Jin Chang, Preparation of fluorescent polystyrene microspheres by gradual solvent evaporation method, European Polymer Journal 45 (2009) 550-556 (Year: 2009).*
Office Action dated Jul. 9, 2019 issued in Japanese Patent Application No. 2017-557531.
Extended Search Report dated Dec. 3, 2018 issued in European Patent Application No. 15911266.3.
Office Action dated Feb. 25, 2020 issued in Japanese Patent Application No. 2017-557531.

* cited by examiner

*Primary Examiner* — Bijan Ahvazi
(74) *Attorney, Agent, or Firm* — Cozen O'Connor

(57) ABSTRACT

The present invention provides a method of producing dye-containing thermosetting resin particles, the method including: dispersing seed particles formed from a thermosetting resin in a dispersion medium; and polymerizing a monomer for thermosetting resin synthesis in the thus obtained dispersion in the presence of a dye and an acid catalyst. By the method of producing dye-containing thermosetting resin particles according to the present invention, dye-containing thermosetting resin particles whose particle size variation coefficient is small at, for example, 8% or less, can be produced without performing a post-treatment such as centrifugation. Therefore, when immunological observation is performed by a fluorescent labeling method using fluorescent dye-containing resin particles produced by the method of producing dye-containing thermosetting resin particles according to the present invention, a high bright spot detection accuracy can be attained.

10 Claims, No Drawings

PROCESS FOR PRODUCING DYE-CONTAINING THERMOSETTING RESIN PARTICLES

RELATED APPLICATIONS

This is a U.S. National Phase Application under 35 USC 371 of International Application PCT/JP2015/085660 filed on Dec. 21, 2015.

TECHNICAL FIELD

The present invention relates to a method of producing dye-containing thermosetting resin particles that can be utilized for immunostaining and the like performed in immunological observation.

BACKGROUND ART

In pathological diagnosis that is performed as a medical diagnosis, for the purpose of obtaining various findings, it is a common practice to prepare a tissue specimen by slicing a tissue sample obtained by evisceration or needle biopsy into a thickness of about several micrometers and then observe the tissue specimen at a magnification under a light microscope. Specifically, after immunological observation in which staining called immunostaining is performed for verifying the expression of an antigen or gene to be detected that is contained in the tissue specimen, an immunological observation in order to diagnose functional abnormalities, such as abnormal expression of a gene or protein, is performed.

As a staining method for immunostaining, for example, a dye staining method using an enzyme, such as DAB staining method, may be employed. In such a staining method using an enzyme as in DAB staining method, however, since the staining concentration is greatly affected by environmental conditions such as temperature and time, there is a drawback that it is difficult to determine the actual amount of an antigen or the like based on the staining concentration.

Therefore, in immunological observation for pathological diagnosis, a fluorescent labeling method using a fluorescent label is often employed. This method characteristically has superior quantitative capability to DAB staining. In the fluorescent labeling method, the amount of a subject antigen is determined by staining the antigen using an antibody modified with a fluorescent dye as a fluorescent label and observing the thus stained antigen. For example, an antigen of interest is labeled on a pathological tissue section by binding thereto an antibody modified with a resin particle containing a fluorescent dye (hereinafter, also referred to as "fluorescent dye-containing resin particle"), and the thus labeled antigen is subsequently observed under a fluorescence microscope. Fluorescent dye-containing resin particles are characterized in that they have a high brightness and the number thereof is measurable. The state and the amount of an antigen can be confirmed by observing bright spots that are derived from such fluorescent dye-containing resin particles appearing in a fluorescence micrograph of a tissue section.

The number of fluorescent dye-containing resin particles is determined by measuring the brightness per resin particle based on a calibration curve. Accordingly, variation in bright spot intensity among the fluorescent dye-containing resin particles leads to deterioration in the accuracy of evaluating the fluorescence signals emitted from the resin particles. One of the causes for such variation in bright spot intensity is variation in the particle size of the fluorescent dye-containing resin particles. That is, the brightness varies depending on the size of the fluorescent dye-containing resin particles, and a dye-containing resin particle having a small particle size yields a low brightness; therefore, for example, when fluorescent dye-containing resin particles having such a particle size that yields a brightness lower than the fluorescence signal detection threshold are present, there is a problem that no fluorescence signal is detected despite the presence of the fluorescent dye-containing resin particles. On the other hand, when fluorescent dye-containing resin particles having such a particle size that yields a brightness much higher than the fluorescence signal detection threshold are present, there is a problem that bright spots are fused together due to saturation and the bright spots cannot thus be distinguished from one another.

Fluorescent dye-containing resin particles are generally produced by polymerizing a monomer in the presence of a fluorescent dye. Fluorescent dye-containing resin particles obtained by a conventional production method have a particle size variation coefficient of 10 to 15% or so and are thus largely variable in terms of particle size; therefore, the use of such resin particles results in a low bright spot detection accuracy due to variation in brightness. In order to obtain fluorescent dye-containing resin particles whose bright spots are detected with high accuracy, it is required to perform a post-treatment in which, for example, the produced fluorescent dye-containing resin particles are subjected to centrifugation and the like so as to make their sizes uniform.

Further, in the preparation of a permanent section, clearing where water contained in a section is replaced with ethanol and xylene is performed. This clearing may cause a problem of fluorescent dye elution. For example, when a section, which has been stained with a staining agent containing fluorescent dye-containing uncharged polystyrene particles as fluorescent dye-containing resin particles, is subjected to clearing, the fluorescent dye bleeds out and this makes it difficult to observe bright spots, which leads to deterioration of the fluorescence signal evaluation accuracy. Particularly, in the case of a fluorescent dye containing a benzene ring in its chemical structure, since the fluorescent dye is likely to elute into an oil-based mounting medium used for the preparation of a permanent section, the fluorescence signal evaluation accuracy strongly tends to be deteriorated.

RELATED ART DOCUMENTS

Patent Documents

[Patent Document 1] Japanese Patent Application No. H8-48492
[Patent Document 2] WO 2014/136885

SUMMARY OF THE INVENTION

Problems to be Solved by the Invention

An object of the present invention is to provide a method of producing resin particles containing a dye, such as a fluorescent dye, which particles can be detected with high accuracy (hereinafter, also referred to as "dye-containing resin particles").

Technical Solution

The present invention is a method of producing dye-containing thermosetting resin particles, the method comprising: dispersing seed particles formed from a thermosetting resin in a dispersion medium; and polymerizing a monomer for thermosetting resin synthesis in the thus obtained dispersion in the presence of a dye and an acid catalyst.

In the method of producing dye-containing thermosetting resin particles, it is preferred that the seed particles have an average particle size of 20 to 150 nm.

In the method of producing dye-containing thermosetting resin particles, it is preferred that the acid catalyst be a mixture of two acids including dodecylbenzene sulfonic acid.

In the method of producing dye-containing thermosetting resin particles, it is preferred that the dye-containing thermosetting resin particles have an average particle size of 60 to 750 nm.

In the method of producing dye-containing thermosetting resin particles, it is preferred that a resin obtained by polymerizing the monomer for thermosetting resin synthesis in the dispersion comprise a structural unit formed from melamine, urea, guanamine, phenol, xylene, or a derivative thereof.

In the method of producing dye-containing thermosetting resin particles, it is preferred that the thermosetting resin forming the seed particles be of the same kind as a thermosetting resin obtained by polymerizing the monomer for thermosetting resin synthesis in the dispersion.

In the method of producing dye-containing thermosetting resin particles, the seed particles can be prepared by polymerizing a monomer for thermosetting resin synthesis.

In the method of producing dye-containing thermosetting resin particles, the seed particles can be prepared by polymerizing the monomer for thermosetting resin synthesis in the presence of a dye.

In the method of producing dye-containing thermosetting resin particles, the dye existing at the time of preparing the seed particles may be of the same kind as the dye existing at the time of polymerizing the monomer for thermosetting resin synthesis in the dispersion.

In the method of producing dye-containing thermosetting resin particles, it is preferred that the dye be an organic fluorescent dye.

In the method of producing dye-containing thermosetting resin particles, it is preferred that the organic fluorescent dye be a rhodamine or an aromatic dye.

Advantageous Effects of the Invention

By the method of producing dye-containing thermosetting resin particles according to the present invention, dye-containing thermosetting resin particles whose particle size variation coefficient is small at, for example, 8% or less, can be produced without performing a post-treatment such as centrifugation. Therefore, when immunological observation is performed by a fluorescent labeling method using fluorescent dye-containing resin particles produced by the method of producing dye-containing thermosetting resin particles according to the present invention, a high bright spot detection accuracy can be attained.

Further, in the dye-containing resin particles produced by the method of producing dye-containing thermosetting resin particles according to the present invention, the dye is unlikely to be disengaged from the resin particles. Therefore, when immunological observation is performed by a fluorescent labeling method using fluorescent dye-containing resin particles produced by the method of producing dye-containing thermosetting resin particles according to the present invention, bleeding of bright spots that occurs in fluorescence observation can be inhibited.

MODE FOR CARRYING OUT THE INVENTION

In the method of producing dye-containing thermosetting resin particles according to the present invention, seed particles formed from a thermosetting resin are dispersed in a dispersion medium and, in the thus obtained dispersion, a monomer for thermosetting resin synthesis is polymerized in the presence of a dye and an acid catalyst.

The dye-containing thermosetting resin particles are particles that are formed from a thermosetting resin and contain a dye.

The thermosetting resin is not particularly restricted as long as it can contain a dye, and specific examples thereof include thermosetting resins that are each composed of a polymer containing a structural unit formed from melamine, urea, guanamine, phenol, xylene, or a derivative of melamine, urea, guanamine, phenol, or xylene.

The seed particles are particles that serve as seeds of the dye-containing thermosetting resin particles. In a subsequent step of the production method of the present invention, a thermosetting resin is formed on the surfaces of the seed particles, and the particles grow into the dye-containing thermosetting resin particles.

The average particle size of the seed particles is preferably 20 to 150 nm, more preferably 40 to 120 nm, still more preferably 60 to 100 nm. When the average particle size of the seed particles is in this range, the particle size variation coefficient of the resulting dye-containing resin particles can be reduced, specifically to 8% or less. The particle size variation coefficient of the seed particles is not particularly restricted; however, it is usually 8 to 14%, preferably 8 to 12%.

The average particle size and the particle size variation coefficient that are indicated for resin particles in the present invention are determined from measured values obtained by observing the resin particles under an SEM and measuring the particle size for 1,000 arbitrary resin particles on the thus obtained SEM image.

The seed particles are formed from the thermosetting resin. The thermosetting resin forming the seed particles may be different from a thermosetting resin obtained by polymerizing the monomer for thermosetting resin synthesis in the dispersion; however, these thermosetting resins are preferably of the same kind.

The seed particles can be prepared by, for example, polymerizing a monomer for thermosetting resin synthesis in accordance with a dispersion polymerization method or the like. When the thermosetting resin forming the seed particles is of the same kind as the thermosetting resin obtained by polymerizing the monomer for thermosetting resin synthesis in the dispersion, the monomer for thermosetting resin synthesis that is used for the preparation of the seed particles may be of the same kind as the monomer for thermosetting resin synthesis that is used for the polymerization performed in the dispersion. These monomers for thermosetting resin synthesis will be described below.

Examples of the dispersion polymerization method include a method in which a monomer for thermosetting resin synthesis, an acid catalyst, a surfactant and the like are dissolved in a dispersion medium and allowed to polymerize with stirring, and particles thus formed in the dispersion medium are recovered by filtration. Examples of the acid catalyst include dodecylbenzene sulfonic acid, sulfamic acid, formic acid, acetic acid, sulfuric acid, hydrochloric acid, nitric acid, and p-toluenesulfonic acid. The surfactant will be described below. The dispersion medium is not particularly restricted, and water can be suitably used. Water mixed with a solvent, such as N,N-dimethylformamide (DMF), ethanol, dimethyl sulfoxide (DMSO), acetone, acetonitrile, tetrahydrofuran (THF) or dioxane, may be used as well. As the dispersion medium, any liquid material in which the above-described polymerization can be performed may be selected and used.

The amounts of the monomer for thermosetting resin synthesis, acid catalyst, emulsifier and the like as well as the polymerization temperature and the polymerization time can be decided as appropriate in accordance with the monomer for thermosetting resin synthesis, the acid catalyst, and the like.

For example, seed particles formed from a melamine resin can be prepared by the following steps. First, 1.5 to 2.0 mL of a 5% aqueous solution of an emulsifier for emulsion polymerization, "EMULGEN (registered trademark)" (polyoxyethylene oleyl ether, manufactured by Kao Corporation), is added to 20 mL of water, and the resulting solution is heated to 68 to 72° C. with stirring. To this solution, 0.1 to 0.5 g of a melamine resin material "NIKALAC MX-035" (manufactured by Nippon Carbide Industries Co., Inc.) and 400 to 750 µL of a 10% aqueous solution of dodecylbenzene sulfonic acid (manufactured by Kanto Chemical Co., Inc.) as an acid catalyst are added, and the resultant is stirred for 40 to 90 minutes. Then, the resultant is heated to 88 to 92° C. and stirred for 20 to 40 minutes. By these steps, a dispersion containing resin particles is obtained. The resin particles are separated from this dispersion and used as seed particles.

The above-described polymerization of the monomer for thermosetting resin synthesis may be performed in the presence of a dye. When the polymerization is performed in the presence of a dye, the polymer generated by the polymerization grows while encapsulating the dye, so that seed particles containing the dye are obtained. Since the polymer generated by this polymerization has a three-dimensional network structure, the dye encapsulated therein is unlikely to be disengaged from the seed particles. When a dye is used in the preparation of such seed particles formed from a melamine resin, for example, the dye may be added to water along with an emulsifier in the above-described step. The dye used for the preparation of the seed particles may be of the same kind as the dye that is allowed to exist at the time of performing the above-described polymerization of the monomer for thermosetting resin synthesis in the dispersion. The dye will be described below.

The seed particles prepared in the above-described manner sometimes contain unreacted monomer for thermosetting resin synthesis and the like; therefore, it is preferred to remove such impurities by washing the seed particles with pure water or the like. Inclusion of unreacted monomer for thermosetting resin synthesis and the like in the seed particles may make it difficult to reduce the particle size variation coefficient of the resulting dye-containing resin particles.

For the separation of the resin particles from the dispersion and the washing with pure water or the like, for example, centrifugation may be employed.

In the method of producing dye-containing thermosetting resin particles according to the present invention, the above-described seed particles are dispersed in a dispersion medium and, in the thus obtained dispersion, a monomer for thermosetting resin synthesis are polymerized in the presence of a dye and an acid catalyst.

The dispersion medium is not particularly restricted, and water can be suitably used. Water mixed with a solvent, such as N,N-dimethylformamide (DMF), ethanol, dimethyl sulfoxide (DMSO), acetone, acetonitrile, tetrahydrofuran (THF) or dioxane, may be used as well. As the dispersion medium, any liquid material in which the above-described polymerization can be performed may be selected and used.

The monomer for thermosetting resin synthesis, the acid catalyst and the dye are added to the dispersion medium. As for the order of adding the seed particles, the monomer for thermosetting resin synthesis, the acid catalyst and the dye to the dispersion medium, it is preferred to add the dye, the seed particles and the monomer for thermosetting resin synthesis to the dispersion medium first, and to add the acid catalyst at last.

The term "monomer for thermosetting resin synthesis" used herein means a compound that yields a thermosetting resin through polymerization. Examples of the monomer for thermosetting resin synthesis include melamine, urea, guanamine, phenol, xylene, and derivatives of melamine, urea, guanamine, phenol, and xylene. When melamine or a derivative thereof is used as the monomer for thermosetting resin synthesis, polymerization thereof yields a melamine resin; when urea or a derivative thereof is used, polymerization thereof yields a urea resin; when guanamine or a derivative thereof is used, polymerization thereof yields a guanamine resin; when phenol or a derivative thereof is used, polymerization thereof yields a phenol resin; and when xylene or a derivative thereof is used, polymerization thereof yields a xylene resin. The same also applies to the monomer for thermosetting resin synthesis that is used for the preparation of the seed particles.

The amount of the monomer for thermosetting resin synthesis that is required to be added for the intended particle size can be calculated from the number of the added seed particles and the volume of the monomer for thermosetting resin synthesis. The number of the seed particles to be added is set at $6.0 \times 10^{14}$ or less, and the amount of the monomer is determined based on the number of the particles in this range. By determining the amount of the monomer for thermosetting resin synthesis to be added and that of the seed particles to be added in this manner, the particle size variation coefficient of the resulting dye-containing resin particles can be easily reduced, preferably to 8% or less.

The above-described acid catalyst is a catalyst for the polymerization reaction of the monomer for thermosetting resin synthesis and facilitates the formation of resin particles. By performing the polymerization of the monomer for thermosetting resin synthesis in the dispersion of the seed particles with the use of the acid catalyst, the particle size variation coefficient of the resulting dye-containing resin particles can be reduced, specifically to 8% or less. Examples of the acid catalyst include dodecylbenzene sulfonic acid, sulfamic acid, formic acid, acetic acid, sulfuric acid, hydrochloric acid, nitric acid, p-toluenesulfonic acid and the like. Especially, a combination of dodecylbenzene sulfonic acid with other acid, such as a combination of dodecylbenzene sulfonic acid with sulfamic acid, dodecylbenzene sulfonic acid with formic acid, dodecylbenzene sulfonic acid with acetic acid, or dodecylbenzene sulfonic acid with p-toluenesulfonic acid, is particularly preferred.

The amount of the acid catalyst to be added is usually 30 to 200 mg, preferably 50 to 150 mg, with respect to 20 mL of water.

The above-described dye is not particularly restricted; however, it is preferably an organic fluorescent dye when the resulting dye-containing resin particles are used for immunostaining. The organic fluorescent dye can be selected from various lines of dyes, such as rhodamine-based dyes, BODIPY (registered trademark, manufactured by Invitrogen), squarylium-based dyes, and aromatic dyes.

Thereamong, aromatic dyes such as aromatic hydrocarbon-based dyes, rhodamine-based dyes and the like are preferred because of their relatively high light resistance and, particularly, perylene, pyrene and perylene diimide that belong to the aromatic dyes are preferred. Further, since rhodamine-based dyes and perylene diimide exhibit excellent quantum yield, light absorption and the like and have excellent luminous efficiency, resin particles containing these dyes have superior emission intensity than those resin particles containing other dyes.

Specific examples of the rhodamine-based dyes include 5-carboxy-rhodamine, 6-carboxy-rhodamine, 5,6-dicarboxy-rhodamine, rhodamine 6G, tetramethyl rhodamine, X-rhodamine, Texas Red, Spectrum Red, LD700 PERCHLORATE, and derivatives thereof.

Specific examples of the BODIPY-based dyes include BODIPY FL, BODIPY TMR, BODIPY 493/503, BODIPY 530/550, BODIPY 558/568, BODIPY 564/570, BODIPY 576/589, BODIPY 581/591, BODIPY 630/650, and BODIPY 650/665 (all of which are manufactured by Invitrogen), and derivatives thereof.

Specific examples of the squarylium-based dyes include SRfluor 680-carboxylate, 1,3-bis[4-(dimethylamino)-2-hydroxyphenyl]-2,4-dihydroxycyclobutenediylium dihydroxide, bis,1,3-bis[4-(dimethylamino)phenyl]-2,4-dihydroxycyclobutenediylium dihydroxide, bis,2-(4-(diethylamino)-2-hydroxyphenyl)-4-(4-(diethyliminio)-2-hydroxycyclohexa-2,5-dienylidene)-3-oxocyclobut-1-enolate, 2-(4-(dibutylamino)-2-hydroxyphenyl)-4-(4-(dibutyliminio)-2-hydroxycyclohexa-2,5-dienylidene)-3-oxocyclobut-1-enolate, 2-(8-hydroxy-1,1,7,7-tetramethyl-1,2,3,5,6,7-hexahydropyrido[3,2,1-ij]quinolin-9-yl)-4-(8-hydroxy-1,1,7,7-tetramethyl-2,3,6,7-tetrahydro-H-pyrido[3,2,1-ij]quinolinium-9(5H)-ylidene)-3-oxocyclobut-1-enolate, and derivatives thereof.

Specific examples of the aromatic hydrocarbon-based dyes include N,N-bis-(2,6-diisopropylphenyl)-1,6,7,12-(4-tert-butylphenoxy)-perylene-3,4,9,10 tetracarbonic acid diimide, N,N'-bis(2,6-diisopropylphenyl)-1,6,7,12-tetraphenoxyperylene-3,4:9,10-tetracarboxydiimide, N,N'-bis(2,6-diisopropylphenyl)perylene-3,4,9,10-bis(dicarbimide), 16-N,N-bis(2,6-dimethylphenyl)perylene-3,4,9,10-tetracarboxylic diimide, 4,4'-[(8,16-dihydro-8,16-dioxodibenzo[a,j]perylene-2,10-diyl)dioxy]dibutyric acid, 2,10-dihydroxydibenzo[a,j]perylene-8,16-dione, 2,10-bis(3-aminopropoxy) dibenzo[a,j]perylene-8,16-dione, 3,3'-[(8,16-dihydro-8,16-dioxodibenzo[a,j]perylen-2,10-diyl)dioxy]dipropylamine, 17-bis(octyloxy)anthra[9,1,2-cde-]benzo[rst]pentaphene-5-10-dione, octadecanoic acid, 5,10-dihydro-5,10-dioxoanthra[9,1,2-cde]benzo[rst]pentaphene-16,17-diyl ester, dihydroxydibenzanthrone, benzenesulfonic acid, 4,4',4",4"'-[[2,9-bis[2,6-bis(1-methylethyl)phenyl]-1,2,3,8,9,10-hexahydro-1,3,8,10-tetraoxoanthra[2,1,9-def: 6,5,10-d'e'f'] diisoquinoline-5,6,12,13-tetrayl]tetrakis(oxy)]tetrakis-, benzeneethanaminium, 4,4',4",4"'-[[2,9-bis[2,6-bis(1-methylethyl)phenyl]-1,2,3,8,9,10-hexahydro-1,3,8,10-tetraoxoanthra[2,1,9-def: 6,5,10-d'e'f']diisoquinoline-5,6,12,13-tetrayl]tetrakis(oxy)]tetrakis[N,N,N-trimethyl-], and derivatives thereof.

The amount of the dye to be added is usually 17 to 27 mg, preferably 20 to 25 mg, with respect to 1 g of the monomer for thermosetting resin synthesis.

The same as described above also applies to the dye used for the preparation of the seed particles.

The average particle size of the dye-containing thermosetting resin particles produced in the above-described manner is preferably 60 to 750 nm, more preferably 60 to 500 nm.

It is preferred to add a surfactant to the above-described dispersion. By performing the polymerization with an addition of a surfactant, the particle size of the resulting dye-containing resin particles can be adjusted. When the surfactant is added in an amount of 10 to 60% by weight with respect to the monomer for thermosetting resin synthesis, particles having a size of 30 to 300 nm are likely to be prepared. The particle size can be reduced by increasing the ratio of the surfactant, and it is also possible to prepare particles of 30 nm or smaller. Meanwhile, the particle size can be increased by reducing the ratio of the surfactant, and it is also possible to prepare particles of 300 nm or larger.

As the surfactant, any of anionic, nonionic and cationic surfactants can be used. Examples of the anionic surfactants include sodium dodecylbenzene sulfonate and the like. Examples of the nonionic surfactants include polyethylene glycol and polyoxyethylene alkyl ether and the like. Examples of the cationic surfactants include dodecyltrimethyl ammonium bromide and the like.

As a commercially available surfactant, for example, "EMULGEN" (registered trademark, manufactured by Kao Corporation) or "NEOPELEX" (registered trademark, manufactured by Kao Corporation) can be suitably used. The effective ingredient of EMULGEN is a polyoxyethylene alkyl ether, and that of NEOPELEX is sodium dodecylbenzene sulfonate.

As the surfactant, it is required to select one which has a clouding point higher than the temperature of the heat-curing reaction performed in the polymerization step. The reason for this is because, if a surfactant having a clouding point lower than the heat-curing reaction temperature is selected, the surfactant would lose its ability to hydrate with water and no longer exert its effect, as a result of which resin particles cannot be produced and resin aggregates are formed instead.

The same as described above also applies to the surfactant used for the preparation of the seed particles.

The reaction conditions in the polymerization of the monomer for thermosetting resin synthesis, such as heat-curing temperature and polymerization time, can be determined based on the type of the monomer for thermosetting resin synthesis in accordance with a known method. The reaction conditions are required to be those which do not cause a reduction in the performance of the dye, that is, within the range of the heat resistance temperature of the dye.

For example, when the thermosetting resin is a melamine resin, the polymerization reaction of the monomer for thermosetting resin synthesis is performed at a temperature of usually 70° C. to 200° C., preferably 150 to 200° C. As for the heat resistance temperature of the dye, since rhodamine-based dyes, BODIPY (registered trademark, manufactured by Invitrogen), squarylium-based dyes and aromatic hydrocarbon-based dyes have a heat resistance temperature of 200° C., 200° C., 200° C., and 300° C. or higher, respectively, it is required to employ such reaction conditions that these dyes can resistant.

By this polymerization reaction, a polymer is generated covering the surface of the seed particles. As a result, thermosetting resin particles having the seed particles in the middle and a thermosetting resin in the periphery are formed. The polymer generated in this polymerization reaction grows while encapsulating the dye; therefore, the dye is incorporated into the periphery of the thermosetting resin, and the thus formed particles function as dye-containing thermosetting resin particles. In cases where the seed particles contain a dye, dye-containing thermosetting resin particles in which both the seed particles and the outer periphery contain a dye are obtained.

Since the polymer generated by this polymerization has a three-dimensional network structure, the dye encapsulated therein is unlikely to be disengaged from the resin particles. In cases where the polymerization reaction is not sufficient and the dye is thus disengaged from the resulting dye-containing resin particles, the dye-containing resin particles may also be subjected to a treatment where the dye-containing resin particles are further heat-cured by heating at a temperature that is not higher than the decomposition temperature or melting temperature of the resin and does not adversely affect the dye and the resin particles, that is, the cross-linking between the dye and the resin particles is further facilitated, and disengagement of the dye is thereby inhibited.

Since the dye-containing thermosetting resin particles generated by this reaction are dispersed in a reaction solution, the dye-containing resin particles are separated from the reaction solution by centrifugation or the like. The thus obtained dye-containing resin particles normally contain unreacted monomer for thermosetting resin synthesis, excess dye, excess acid catalyst and the like; therefore, it is preferred to remove such impurities by washing the dye-containing resin particles. For example, the washing is performed by adding ultrapure water to the resin separated from the reaction solution, re-dispersing the resin with ultrasonic irradiation, and then centrifuging the resulting dispersion, followed by removal of supernatant. Such a series of washing operations of re-dispersion in ultrapure water, centrifugation and removal of supernatant is preferably repeated plural times until the resulting supernatant no longer shows any light absorption and fluorescence emission attributed to the resin or the dye.

The dye-containing thermosetting resin particles produced by the production method of the present invention has a small particle size variation coefficient, which is specifically 8% or less. That is, the dye-containing thermosetting resin particles produced by the production method of the present invention exhibit high monodispersibility. Therefore, when immunological observation is performed by a fluorescent labeling method using fluorescent dye-containing resin particles produced by the method of producing dye-containing thermosetting resin particles according to the present invention, since the variation in bright spot intensity attributed to the particle size variation of the resin particles is small, so that a high bright spot detection accuracy can be attained, the dye-containing resin particles can be detected with high accuracy, and the number of the particles can be measured precisely.

Further, in the dye-containing thermosetting resin particles produced by the method of producing dye-containing thermosetting resin particles according to the present invention, since the dye is incorporated in a state of being encapsulated by a polymer having a three-dimensional network structure as described above, the dye is retained in the resin particles and is thus unlikely to be released to the outside of the resin particles. Therefore, when immunological observation is performed by a fluorescent labeling method using fluorescent dye-containing resin particles produced by the method of producing dye-containing thermosetting resin particles according to the present invention, bleeding of bright spots that occurs in fluorescence observation can be inhibited.

On the other hand, when a thermoplastic resin, not a thermosetting resin, is used in the above-described production method, although dye-containing resin particles having a small particle size variation coefficient can be obtained, since the polymer constituting the resin particles does not have a three-dimensional network structure, it is difficult to allow the dye to be encapsulated into the polymer, so that the dye is likely to be released to the outside of the resin particles. Accordingly, when immunological observation is performed by a fluorescent labeling method using fluorescent dye-containing resin particles obtained from a thermoplastic resin, bleeding of bright spots is likely to occur in fluorescence observation.

EXAMPLES

The measurement method and the evaluation method that were employed in Examples are described below.

[Measurement of Average Particle Size and Particle Size Variation Coefficient of Resin Particles]

A dispersion of subject resin particles was dried on a substrate, and the resin particles were observed under an SEM. On the thus obtained SEM image, the particle size was measured for arbitrary 1,000 particles, and the average particle size and the particle size variation coefficient were calculated.

[Evaluation of Variation in Bright Spots]

A dispersion of subject resin particles was coated on a glass substrate, and a fluorescence micrograph thereof was taken. Then, an SEM observation was performed in the same field of view. On the thus obtained fluorescence micrograph and SEM image, the brightness was measured for arbitrary 100 bright spots each representing a particle. The average value of the bright spot brightness was calculated, and an evaluation of "A" was given when the number of particles having a brightness outside the range of one-half to twice the average value was 1 or less; an evaluation of "B" was given when the number of such particles was 2 to 4; and an evaluation of "C" was given when the number of such particles was 5 or greater.

[Evaluation of Dye Retainability]

To each of two plastic centrifuge tubes, 1 mL of a dispersion containing subject particles in an amount of 1 mg/mL was added, and the particles were separated by centrifugation. Ethanol was added thereto and the particles were ultrasonically dispersed, whereby particle solutions in an ethanol-substituted state were obtained. These particle solutions were subjected to centrifugation once again and, after removing the resulting supernatants, DMF was added to one of the tubes while xylene was added to the other tube in an amount of 1 mL each, and the particles were ultrasonically dispersed. The resultants were left to stand for 10 minutes and subsequently centrifuged, and the presence or absence of precipitate generation was evaluated. The dye retainability was evaluated as "A" when precipitates were generated and the supernatant was colorless, or the dye retainability was evaluated as "C" when the solution was colored without precipitate generation.

Example 1

(Preparation of Seed Particles)

To a solution obtained by dissolving 4.4 mg of perylene diimide, which is a fluorescent dye, in 20 mL of water, 2 mL of a 5 wt % aqueous solution of "EMULGEN (registered trademark) 430" (polyoxyethylene oleyl ether, manufactured by Kao Corporation), which is an emulsifier for emulsion polymerization, was added. After heating this solution to 70° C. on a hot stirrer with stirring, 0.14 g of a melamine resin material "NIKALAC MX-035" (manufactured by Nippon Carbide Industries Co., Inc.) in terms of solid content was added to the solution. To the resulting solution, 0.70 mL of a 10 wt % aqueous solution of dodecylbenzene sulfonic acid (manufactured by Kanto Chemical Co., Inc.), which is an acid catalyst, was further added, and the resultant was heated to 70° C. and stirred for 50 minutes, followed by heating to 90° C. and stirring for another 20 minutes, whereby a melamine resin was synthesized.

Separation of resin particles from the thus obtained dispersion of resin particles as well as washing of the resin particles for removal of impurities such as excess resin material and fluorescent dye adhering thereto were performed as follows. The dispersion was centrifuged at 20,000 G for 90 minutes using a centrifugal machine (Micro Refrigerated Centrifuge 3740, manufactured by Kubota Corporation) and, after removing the resulting supernatant, the thus separated particles were re-dispersed by adding ultrapure water and irradiating an ultrasonic wave thereto. The centrifugation, the removal of supernatant, and the treatment by re-dispersion in ultrapure water were repeated five times. The thus obtained resin particles were defined as "seed particles 1". The seed particles 1 had an average particle size of 20 nm and a particle size variation coefficient of 12%.

(Production of Dye-Containing Thermosetting Resin Particles)

To a solution obtained by dissolving 1.9 mg of perylene diimide, which is a fluorescent dye, in 20 mL of water, 2 mL of a 5 wt % aqueous solution of "EMULGEN (registered trademark) 430" (polyoxyethylene oleyl ether, manufactured by Kao Corporation), which is an emulsifier for emulsion polymerization, was added. After heating this solution to 70° C. on a hot stirrer with stirring, $5.0 \times 10^{14}$ of the seed particles 1 were added to the solution, and 0.06 g of a melamine resin material "NIKALAC MX-035" (manufactured by Nippon Carbide Industries Co., Inc.) in terms of solid content was further added to the resulting dispersion. To this dispersion, 0.70 mL of an acid solution obtained by mixing a 2.47 wt % aqueous solution of sulfamic acid (manufactured by Kanto Chemical Co., Inc.), which is an acid catalyst, and a 10 wt % aqueous solution of dodecylbenzene sulfonic acid, which is also an acid catalyst, at a ratio of 1:3 was added, and the resultant was heated to 70° C. and stirred for 50 minutes, followed by heating to 90° C. and stirring for another 20 minutes, whereby a melamine resin was synthesized.

Separation of resin particles from the thus obtained dispersion of resin particles as well as washing of the resin particles for removal of impurities such as excess resin material and fluorescent dye adhering thereto were performed as follows. The dispersion was centrifuged at 20,000 G for 90 minutes using a centrifugal machine (Micro Refrigerated Centrifuge 3740, manufactured by Kubota Corporation) and, after removing the resulting supernatant, the thus separated particles were re-dispersed by adding ultrapure water and irradiating an ultrasonic wave thereto. The centrifugation, the removal of supernatant, and the treatment by re-dispersion in ultrapure water were repeated five times. The thus obtained resin particles were defined as "dye-containing thermosetting resin particles 1". The dye-containing thermosetting resin particles 1 had an average particle size of 50 nm and a particle size variation coefficient of 10%.

For the dye-containing thermosetting resin particles 1, the bright spot variation and the dye retainability were evaluated. The results thereof are shown in Table 1.

Example 2

(Preparation of Seed Particles)

Seed particles 2 were prepared in the same manner as in "(Preparation of Seed Particles)" of Example 1, except that the amount of perylene diimide was changed to 4.9 mg and NIKALAC MX-035 was added in an amount of 0.18 g in terms of solid content. The thus obtained seed particles 2 had an average particle size of 30 nm and a particle size variation coefficient of 11%.

(Production of Dye-Containing Thermosetting Resin Particles)

Dye-containing thermosetting resin particles 2 were produced in the same manner as in "(Production of Dye-containing Thermosetting Resin Particles)" of Example 1, except that $4.0 \times 10^{14}$ of the seed particles 2 were used as the seed particles, NIKALAC MX-035 was used in an amount of 0.1 g in terms of solid content, and perylene diimide was used in an amount of 3.2 mg. The dye-containing thermosetting resin particles 2 had an average particle size of 60 nm and a particle size variation coefficient of 8%.

For the dye-containing thermosetting resin particles 2, the bright spot variation and the dye retainability were evaluated. The results thereof are shown in Table 1.

Example 3

(Preparation of Seed Particles)

Seed particles 3 were prepared in the same manner as in "(Preparation of Seed Particles)" of Example 1, except that the amount of perylene diimide was changed to 7.8 mg and NIKALAC MX-035 was added in an amount of 0.24 g in terms of solid content. The thus obtained seed particles 3 had an average particle size of 60 nm and a particle size variation coefficient of 12%.

(Production of Dye-Containing Thermosetting Resin Particles)

Dye-containing thermosetting resin particles 4 were produced in the same manner as in "(Production of Dye-containing Thermosetting Resin Particles)" of Example 1, except that $1.0 \times 10^{14}$ of the seed particles 3 were used as the seed particles, NIKALAC MX-035 was used in an amount of 0.3 g in terms of solid content, and perylene diimide was used in an amount of 9.5 mg. The dye-containing thermosetting resin particles 3 had an average particle size of 150 nm and a particle size variation coefficient of 8%.

For the dye-containing thermosetting resin particles 3, the bright spot variation and the dye retainability were evaluated. The results thereof are shown in Table 1.

Example 4

(Preparation of Seed Particles)

Seed particles 4 were prepared in the same manner as in "(Preparation of Seed Particles)" of Example 1, except that the amount of perylene diimide was changed to 9.9 mg and NIKALAC MX-035 was added in an amount of 0.32 g in terms of solid content. The thus obtained seed particles 4 had an average particle size of 80 nm and a particle size variation coefficient of 12%.

(Production of Dye-Containing Thermosetting Resin Particles)

Dye-containing thermosetting resin particles 4 were produced in the same manner as in "(Production of Dye-containing Thermosetting Resin Particles)" of Example 1, except that $2.7 \times 10^{13}$ of the seed particles 4 were used as the seed particles, NIKALAC MX-035 was used in an amount of 0.6 g in terms of solid content, and perylene diimide was used in an amount of 13.3 mg. The dye-containing thermosetting resin particles 4 had an average particle size of 300 nm and a particle size variation coefficient of 7%.

For the dye-containing thermosetting resin particles 4, the bright spot variation and the dye retainability were evaluated. The results thereof are shown in Table 1.

Example 5

(Preparation of Seed Particles)

Seed particles 5 were prepared in the same manner as in "(Preparation of Seed Particles)" of Example 1, except that the amount of perylene diimide was changed to 14.4 mg and NIKALAC MX-035 was added in an amount of 0.45 g in terms of solid content. The thus obtained seed particles 5 had an average particle size of 150 nm and a particle size variation coefficient of 14%.

(Production of Dye-Containing Thermosetting Resin Particles)

Dye-containing thermosetting resin particles 5 were produced in the same manner as in "(Production of Dye-containing Thermosetting Resin Particles)" of Example 1, except that $2.8 \times 10^{12}$ of the seed particles 5 were used as the seed particles, NIKALAC MX-035 was used in an amount of 0.9 g in terms of solid content, and perylene diimide was used in an amount of 19.9 mg. The dye-containing thermosetting resin particles 5 had an average particle size of 750 nm and a particle size variation coefficient of 6%.

For the dye-containing thermosetting resin particles 5, the bright spot variation and the dye retainability were evaluated. The results thereof are shown in Table 1.

Example 6

Dye-containing thermosetting resin particles 6 were produced in the same manner as in "(Production of Dye-containing Thermosetting Resin Particles)" of Example 2, except that 2.9 mg of "Sulforhodamine 101" (manufactured by Sigma-Aldrich) was used as the fluorescent dye. The dye-containing thermosetting resin particles 6 had an average particle size of 60 nm and a particle size variation coefficient of 6%.

For the dye-containing thermosetting resin particles 6, the bright spot variation and the dye retainability were evaluated. The results thereof are shown in Table 1.

Example 7

Dye-containing thermosetting resin particles 7 were produced in the same manner as in "(Production of Dye-containing Thermosetting Resin Particles)" of Example 3, except that 9.1 mg of "Sulforhodamine 101" (manufactured by Sigma-Aldrich) was used as the fluorescent dye. The dye-containing thermosetting resin particles 7 had an average particle size of 150 nm and a particle size variation coefficient of 8%.

For the dye-containing thermosetting resin particles 7, the bright spot variation and the dye retainability were evaluated. The results thereof are shown in Table 1.

Example 8

Dye-containing thermosetting resin particles 8 were produced in the same manner as in "(Production of Dye-containing Thermosetting Resin Particles)" of Example 4, except that 12.8 mg of "Sulforhodamine 101" (manufactured by Sigma-Aldrich) was used as the fluorescent dye. The dye-containing thermosetting resin particles 8 had an average particle size of 300 nm and a particle size variation coefficient of 7%.

For the dye-containing thermosetting resin particles 8, the bright spot variation and the dye retainability were evaluated. The results thereof are shown in Table 1.

Example 9

Dye-containing thermosetting resin particles 9 were produced in the same manner as in "(Production of Dye-containing Thermosetting Resin Particles)" of Example 5, except that 19.0 mg of "Sulforhodamine 101" (manufactured by Sigma-Aldrich) was used as the fluorescent dye. The dye-containing thermosetting resin particles 9 had an average particle size of 750 nm and a particle size variation coefficient of 6%.

For the dye-containing thermosetting resin particles 9, the bright spot variation and the dye retainability were evaluated. The results thereof are shown in Table 1.

Example 10

Dye-containing thermosetting resin particles 10 were produced in the same manner as in Example 3, except that the acid catalyst solution was changed from the acid solution obtained by mixing a 2.47 wt % aqueous solution of sulfamic acid and a 10 wt % aqueous solution of dodecylbenzene sulfonic acid at a ratio of 1:3 to a 10 wt % aqueous solution of dodecylbenzene sulfonic acid. The dye-containing thermosetting resin particles 10 had an average particle size of 150 nm and a particle size variation coefficient of 10%.

For the dye-containing thermosetting resin particles 10, the bright spot variation and the dye retainability were evaluated. The results thereof are shown in Table 1.

Comparative Example 1

To a solution obtained by dissolving 10.0 mg of perylene diimide, which is a fluorescent dye, in 20 mL of water, 2 mL of a 5 wt % aqueous solution of "EMULGEN (registered trademark) 430" (polyoxyethylene oleyl ether, manufactured by Kao Corporation), which is an emulsifier for emulsion polymerization, was added. After heating this solution to 70° C. on a hot stirrer with stirring, 0.31 g of a melamine resin material "NIKALAC MX-035" (manufactured by Nippon Carbide Industries Co., Inc.) in terms of solid content was added to the solution. To the resulting solution, 0.70 mL of a 10 wt % aqueous solution of dodecylbenzene sulfonic acid (manufactured by Kanto Chemical Co., Inc.), which is an acid catalyst, was further added, and the resultant was heated to 70° C. and stirred for 50 minutes, followed by heating to 90° C. and stirring for another 20 minutes, whereby a melamine resin was synthesized.

Separation of resin particles from the thus obtained dispersion of resin particles as well as washing of the resin particles for removal of impurities such as excess resin material and fluorescent dye adhering thereto were performed as follows. The dispersion was centrifuged at 20,000 G for 15 minutes using a centrifugal machine (Micro Refrigerated Centrifuge 3740, manufactured by Kubota Corporation) and, after removing the resulting supernatant, the thus separated particles were re-dispersed by adding ultrapure water and irradiating an ultrasonic wave thereto. The centrifugation, the removal of supernatant, and the treatment by re-dispersion in ultrapure water were repeated five times. The thus obtained resin particles were defined as "dye-containing resin particles R1". The dye-containing resin particles R1 had an average particle size of 60 nm and a variation coefficient of 12%.

For the dye-containing resin particles R1, the bright spot variation and the dye retainability were evaluated. The results thereof are shown in Table 2.

Comparative Example 2

Dye-containing resin particles R2 were produced in the same manner as in Comparative Example 1, except that "NIKALAC MX-035" was used in an amount of 0.45 g in terms of solid content and perylene diimide was used in an amount of 14.4 mg. The dye-containing resin particles R2 had an average particle size of 150 nm and a particle size variation coefficient of 13%.

For the dye-containing resin particles R2, the bright spot variation and the dye retainability were evaluated. The results thereof are shown in Table 2.

Comparative Example 3

Dye-containing resin particles R3 were produced in the same manner as in Comparative Example 1, except that "NIKALAC MX-035" was used in an amount of 0.60 g in terms of solid content and perylene diimide was used in an amount of 18.0 mg. The dye-containing resin particles R3 had an average particle size of 300 nm and a particle size variation coefficient of 17%.

For the dye-containing resin particles R3, the bright spot variation and the dye retainability were evaluated. The results thereof are shown in Table 2.

Comparative Example 4

Dye-containing resin particles R4 were produced in the same manner as in Comparative Example 1, except that "NIKALAC MX-035" was used in an amount of 0.84 g in terms of solid content and perylene diimide was used in an amount of 27.0 mg. The dye-containing resin particles R4 had an average particle size of 750 nm and a particle size variation coefficient of 18%.

For the dye-containing resin particles R4, the bright spot variation and the dye retainability were evaluated. The results thereof are shown in Table 2.

Comparative Example 5

(Preparation of Seed Particles)
In a reaction vessel, 20 mL of water, 0.20 g of styrene and 0.04 g of glycidyl methacrylate were added and subjected to Ar bubbling. To the resulting solution, 0.20 mL of an aqueous solution obtained by dissolving 50 mg of 2,2-azobis(2-methylpropionamidine)dihydrochloride, which is a water-soluble radical generator, in 0.50 mL of water was added. The reaction vessel was capped and then heated to 70° C. to perform reaction for 12 hours. The resulting cloudy reaction solution containing resin particles generated therein was centrifuged at 20,000 G for 90 minutes using a centrifugal machine (Micro Refrigerated Centrifuge 3740, manufactured by Kubota Corporation), and the resin particles were recovered. After removing the resulting supernatant, the thus separated particles were re-dispersed by adding ultrapure water and irradiating an ultrasonic wave thereto. The centrifugation, the removal of supernatant, and the treatment by re-dispersion in ultrapure water were repeated three times. The thus obtained resin particles were defined as "seed particles R5". The seed particles R5 had an average particle size of 60 nm and a particle size variation coefficient of 11%.

(Production of Dye-Containing Resin Particles)
In a reaction vessel, 20 mL of water, 0.20 g of styrene, 0.04 g of glycidyl methacrylate and $1.0 \times 10^{14}$ of the seed particles R5 were added and subjected to Ar bubbling. To this dispersion, 20 mg of an aqueous solution obtained by dissolving 50 mg of 2,2-azobis(2-methylpropionamidine)dihydrochloride in 0.50 mL of water was added. The reaction vessel was capped and then heated to 70° C. to perform reaction for 12 hours. The resulting cloudy reaction solution containing resin particles generated therein was centrifuged at 20,000 G for 90 minutes using a centrifugal machine (Micro Refrigerated Centrifuge 3740, manufactured by Kubota Corporation), and the resin particles were recovered. After removing the resulting supernatant, the thus separated particles were re-dispersed by adding ultrapure water and irradiating an ultrasonic wave thereto. The centrifugation, the removal of supernatant, and the treatment by re-dispersion in ultrapure water were repeated three times. To the thus obtained aqueous dispersion of the resin particles, an equal amount of methanol was added and, while vigorously stirring the resultant using a stirrer at room temperature, 9.5 mg of perylene diimide was added in the form of a methanol solution. After 8 hours, the aqueous dispersion was centrifuged at 20,000 G for 90 minutes using a centrifugal machine (Micro Refrigerated Centrifuge 3740, manufactured by Kubota Corporation), and the resin particles were recovered. After removing the resulting supernatant, the recovered resin particles were dispersed in water, followed by filtration through a 1.0-μm filter and removal of excess dye. The resin particles separated by the filtration were re-dispersed in water, and the resultant was subjected to three rounds of centrifugation, removal of supernatant, and a treatment by re-dispersion in ultrapure water under the same conditions as described above. The thus obtained particles were defined as "dye-containing resin particles R5". The dye-containing resin particles R5 had an average particle size of 150 nm and a particle size variation coefficient of 7%.

For the dye-containing resin particles R5, the bright spot variation and the dye retainability were evaluated. The results thereof are shown in Table 2.

Comparative Example 6

Dye-containing resin particles R6 were produced in the same manner as in "(Production of Dye-containing Thermosetting Resin Particles)" of Example 3, except that the seed particles R5 were used as the seed particles. The dye-containing resin particles R6 had an average particle size of 150 nm and a particle size variation coefficient of 8%.

For the dye-containing resin particles R6, the bright spot variation and the dye retainability were evaluated. The results thereof are shown in Table 2.

TABLE 1

|  |  | Example 1 | Example 2 | Example 3 | Example 4 | Example 5 | Example 6 |
|---|---|---|---|---|---|---|---|
| Seed particles | Presence/Absence | present | present | present | present | present | present |
|  | Monomer | NIKALAC MX-035 | NIKALAC MX-035 | NIKALAC MX-035 | NIKALAC MX-035 | NIKALAC MX-035 | NIKALAC MX-035 |
|  | Average particle size | 20 nm | 30 nm | 60 nm | 80 nm | 150 nm | 30 nm |
|  | Number of particles | $5.0 \times 10^{14}$ | $4.0 \times 10^{14}$ | $1.0 \times 10^{14}$ | $2.7 \times 10^{13}$ | $2.8 \times 10^{12}$ | $4.0 \times 10^{14}$ |
| Production of dye-containing thermosetting resin particles | Monomer Type | NIKALAC MX-035 | NIKALAC MX-035 | NIKALAC MX-035 | NIKALAC MX-035 | NIKALAC MX-035 | NIKALAC MX-035 |
|  | Amount[2] | 0.06 g (solid content) | 0.10 g (solid content) | 0.30 g (solid content) | 0.60 g (solid content) | 0.90 g (solid content) | 0.10 g (solid content) |
|  | Acid catalyst solution Type | Mixed solution[1] of dodecylbenzene sulfonic acid and sulfamic acid | Mixed solution[1] of dodecylbenzene sulfonic acid and sulfamic acid | Mixed solution[1] of dodecylbenzene sulfonic acid and sulfamic acid | Mixed solution[1] of dodecylbenzene sulfonic acid and sulfamic acid | Mixed solution[1] of dodecylbenzene sulfonic acid and sulfamic acid | Mixed solution[1] of dodecylbenzene sulfonic acid and sulfamic acid |
|  | Amount[2] | 0.70 mL | 0.70 mL | 0.70 mL | 0.70 mL | 0.70 mL | 0.70 mL |
|  | Dye Type | perylene diimide | perylene diimide | perylene diimide | perylene diimide | perylene diimide | Sulforhodamine 101 |
|  | Amount[2] | 1.9 mg | 3.2 mg | 9.5 mg | 13. m3g | 19.9 mg | 2.9 mg |
|  | Pure water Amount[2] | 20 mL | 20 mL | 20 mL | 20 mL | 20 mL | 20 mL |
| Particle size |  | 50 nm | 60 nm | 150 nm | 300 nm | 750 nm | 60 nm |
| Variation coefficient |  | 10% | 8% | 8% | 7% | 6% | 6% |
| Bright spot variation |  | B | A | A | A | A | A |
| Dye retainability |  | A | A | A | A | A | A |

|  |  |  | Example 7 | Example 8 | Example 9 | Example 10 |
|---|---|---|---|---|---|---|
|  | Seed particles | Presence/Absence | present | present | present | present |
|  |  | Monomer | NIKALAC MX-035 | NIKALAC MX-035 | NIKALAC MX-035 | NIKALAC MX-035 |
|  |  | Average particle size | 60 nm | 80 nm | 60 nm | 60 nm |
|  |  | Number of particles | $1.0 \times 10^{14}$ | $2.7 \times 10^{13}$ | $1.0 \times 10^{14}$ | $1.0 \times 10^{14}$ |
|  | Production of dye-containing thermosetting resin particles | Monomer Type | NIKALAC MX-035 | NIKALAC MX-035 | NIKALAC MX-035 | NIKALAC MX-035 |
|  |  | Amount[2] | 0.30 g (solid content) | 0.60 g (solid content) | 0.90 g (solid content) | 0.30 g (solid content) |
|  |  | Acid catalyst solution Type | Mixed solution[1] of dodecylbenzene sulfonic acid and sulfamic acid | Mixed solution[1] of dodecylbenzene sulfonic acid and sulfamic acid | Mixed solution[1] of dodecylbenzene sulfonic acid and sulfamic acid | 10 wt % aqueous solution of dodecylbenzene sulfonic acid |
|  |  | Amount[2] | 0.70 mL | 0.70 mL | 0.70 mL | 0.70 mL |
|  |  | Dye Type | Sulforhodamine 101 | Sulforhodamine 101 | Sulforhodamine 101 | perylene diimide |
|  |  | Amount[2] | 9.1 mg | 12.8 mg | 19.0 mg | 9.5 mg |
|  |  | Pure water Amount[2] | 20 mL | 20 mL | 20 mL | 20 mL |
|  | Particle size |  | 150 nm | 300 nm | 750 nm | 150 nm |
|  | Variation coefficient |  | 8% | 7% | 6% | 10% |
|  | Bright spot variation |  | A | A | A | B |
|  | Dye retainability |  | A | A | A | A |

[1]Solution obtained by mixing 2.7 wt % sulfamic acid aqueous solution and 10 wt % dodecylbenzene sulfonic acid aqueous solution at a ratio of 1:3
[2]Amount added at the time of resin synthesis in the presence of seed particles

TABLE 2

|  |  | Comparative Example 1 | Comparative Example 2 | Comparative Example 3 | Comparative Example 4 |
|---|---|---|---|---|---|
| Seed particles | Presence/Absence | absent | absent | absent | absent |
|  | Monomer |  |  |  |  |
|  | Average particle size |  |  |  |  |
|  | Number of particles |  |  |  |  |

TABLE 2-continued

| Production of dye-containing thermosetting resin particles | Monomer | Type | NIKALAC MX-035 | NIKALAC MX-035 | NIKALAC MX-035 | NIKALAC MX-035 |
|---|---|---|---|---|---|---|
| | | Amount[2] | 0.31 g (solid content) | 0.45 g (solid content) | 0.60 g (solid content) | 0.84 g (solid content) |
| | Acid catalyst solution | Type | 10 wt % dodecylbenzene sulfonic acid aqueous solution | 10 wt % dodecylbenzene sulfonic acid aqueous solution | 10 wt % dodecylbenzene sulfonic acid aqueous solution | 10 wt % dodecylbenzene sulfonic acid aqueous solution |
| | | Amount[2] | 0.7 mL | 0.7 mL | 0.7 mL | 0.7 mL |
| | Radical generator | Type Amount[2] | | | | |
| | Dye | Type | perylene diimide | perylene diimide | perylene diimide | perylene diimide |
| | | Amount[2] | 10 mg | 14.4 mg | 18 mg | 27 mg |
| | Pure water | Amount[2] | 20 mL | 20 mL | 20 mL | 20 mL |
| Particle size | | | 60 nm | 150 nm | 300 nm | 750 nm |
| Variation coefficient | | | 12% | 13% | 17% | 18% |
| Bright spot variation | | | C | C | C | C |
| Dye retainability | | | A | A | A | A |

| | | | | Comparative Example 5 | Comparative Example 6 |
|---|---|---|---|---|---|
| | Seed particles | Presence/Absence | | present | present |
| | | Monomer | | styrene | styrene |
| | | Average particle size | | 60 nm | 60 nm |
| | | Number of particles | | $1.0 \times 10^{14}$ | $1.0 \times 10^{14}$ |
| | Production of dye-containing thermosetting resin particles | Monomer | Type | styrene | NIKALAC MX-035 |
| | | | Amount[2] | 0.20 g | 0.30 g (solid content) |
| | | Acid catalyst solution | Type | | Mixed solution[1] of dodecylbenzene sulfonic acid and sulfamic acid |
| | | | Amount[2] | | 0.7 mL |
| | | Radical generator | Type | 2,2-azobis (2-methyl-propio-namidine) dihydrochloride | |
| | | | Amount[2] | 20 mg | |
| | | Dye | Type | perylene diimide | perylene diimide |
| | | | Amount[2] | 9.5 mg | 9.5 mg |
| | | Pure water | Amount[2] | 20 mL | 20 mL |
| | Particle size | | | 150 nm | 150 nm |
| | Variation coefficient | | | 7% | 8% |
| | Bright spot variation | | | A | A |
| | Dye retainability | | | C | C |

[1]Solution obtained by mixing 2.7 wt % sulfamic acid aqueous solution and 10 wt % dodecylbenzene sulfonic acid aqueous solution at a ratio of 1:3
[2]Amount added at the time of resin synthesis in the presence of seed particles

The invention claimed is:

1. A method of producing dye-containing thermosetting resin particles for immunostaining, said method comprising:
dispersing seed particles formed from a thermosetting resin in a dispersion medium; and
polymerizing a monomer for thermosetting resin synthesis in the obtained dispersion in the presence of an organic fluorescent dye and an acid catalyst,
wherein the organic fluorescent dye is detectable in immunological observation.

2. The method of producing dye-containing thermosetting resin particles according to claim 1, wherein said seed particles have an average particle size of 20 to 150 nm.

3. The method of producing dye-containing thermosetting resin particles according to claim 1, wherein said acid catalyst is a mixture of two acids including dodecylbenzene sulfonic acid.

4. The method of producing dye-containing thermosetting resin particles according to claim 1, wherein said dye-containing thermosetting resin particles have an average particle size of 60 to 750 nm.

5. The method of producing dye-containing thermosetting resin particles according to claim 1, wherein said thermosetting resin forming said seed particles is of the same kind as a thermosetting resin obtained by polymerizing said monomer for thermosetting resin synthesis in said dispersion.

6. The method of producing dye-containing thermosetting resin particles according to claim 1, wherein said seed particles are prepared by polymerizing a monomer for thermosetting resin synthesis.

7. The method of producing dye-containing thermosetting resin particles according to claim 6, wherein said seed particles are prepared by polymerizing said monomer for thermosetting resin synthesis in the presence of a dye.

8. The method of producing dye-containing thermosetting resin particles according to claim 7, wherein said dye existing at the time of preparing said seed particles is of the same kind as the dye existing at the time of polymerizing said monomer for thermosetting resin synthesis in said dispersion.

9. The method of producing dye-containing thermosetting resin particles according to claim 1, wherein said organic fluorescent dye is a rhodamine or an aromatic dye.

10. The method of producing dye-containing thermosetting resin particles according to claim 1, wherein a resin obtained by polymerizing said monomer for thermosetting resin synthesis in said dispersion comprises a structural unit formed from melamine, urea, guanamine, phenol, xylene, or a derivative thereof.

* * * * *